United States Patent [19]
Hoffman

[11] Patent Number: 4,560,877
[45] Date of Patent: Dec. 24, 1985

[54] SOLID STATE DETECTOR MODULE

[75] Inventor: David M. Hoffman, New Berlin, Wis.

[73] Assignee: General Electric Company, Milwaukee, Wis.

[21] Appl. No.: 454,200

[22] Filed: Dec. 29, 1982

[51] Int. Cl.[4] ............................................. G01T 1/202
[52] U.S. Cl. ................................... 250/366; 250/367; 250/368; 250/370
[58] Field of Search .............. 250/367, 370, 366, 368, 250/363 R, 363 S, 361 R; 378/19

[56] References Cited

U.S. PATENT DOCUMENTS

| | | | |
|---|---|---|---|
| 3,978,337 | 8/1976 | Nickles et al. | 250/367 |
| 4,110,621 | 8/1978 | Horn | 250/368 |
| 4,181,856 | 1/1980 | Bone | 250/366 |
| 4,187,427 | 2/1980 | Cusano | 250/367 |
| 4,220,860 | 9/1980 | Carlson et al. | 250/361 |
| 4,234,792 | 11/1980 | DeCou et al. | 250/367 |
| 4,267,446 | 5/1981 | Brown et al. | 250/394 |
| 4,338,521 | 7/1982 | Shaw et al. | 250/366 |
| 4,365,155 | 12/1982 | Oi et al. | 250/367 |
| 4,429,227 | 1/1984 | DiBianca et al. | 250/367 |

FOREIGN PATENT DOCUMENTS

| | | |
|---|---|---|
| 0039916 | 5/1981 | European Pat. Off. . |
| 3247204 | 12/1982 | Fed. Rep. of Germany . |
| 893505 | 3/1960 | United Kingdom . |
| 994879 | 6/1961 | United Kingdom . |
| 2045795 | 3/1980 | United Kingdom . |
| 2072452 | 9/1980 | United Kingdom . |

OTHER PUBLICATIONS

Patent Abstracts of Japan, vol. 7, No. 67 (P-184) [1212], Mar. 19, 1983.

Primary Examiner—Alfred E. Smith
Assistant Examiner—Carolyn E. Fields
Attorney, Agent, or Firm—Leydig, Voit & Mayer, Ltd.

[57] ABSTRACT

A solid state detector in which each scintillator is optimally configured and coupled with its associated sensing diode in a way which exploits light piping effects to enhance efficiency, and at the same time provide a detector which is modular in nature. To achieve light piping, the scintillator crystal is oriented such that its sides conform with the crystal cleavage plane, and the sides are highly polished. An array of tungsten collimator plates define the individual channels. Multi-channel scintillator/diode modules are mounted behind and in registry with the plurality of collimator plates. A plurality of scintillators are bonded together after coating the surfaces thereof to minimize optical crosstalk. After lapping the face of the scintillator module, it is then bonded to a diode module with individual scintillators in registration with individual diodes. The module is then positioned in the detector array with collimator plates at the junctions between the scintillators.

9 Claims, 3 Drawing Figures

SOLID STATE DETECTOR MODULE

This invention relates to x-ray detectors and more particularly to the class of x-ray detectors which has come to be known as "solid state".

Detectors of this sort have an important use in CT scanners. In contrast to the early primitive scanners using only one or a very small number (about 30) detectors, modern scanners incorporate hundreds of detector cells, attempt to pack them as tightly as practical to increase spatial resolution, and make them as efficient as practical in order to increase contrast resolution.

In spite of the fact that xenon detectors have met with a good measure of success in CT scanning, efforts are underway to produce high resolution solid state detectors. Among the benefits achievable by the solid state approach are a higher theoretical quantum detection efficiency. However, the approach does face certain problems not encountered with the xenon gas approach. The elements which produce the electrical signal in a solid state detector are typically photodiodes, and the active surfaces thereof are adversely effected by incident x-radiation. When x-radiation hits the active diode surface, it can cause noise, rendering the reading then being taken inaccurate and, in the long run can degrade the diode itself. As a result, it is necessary to take reasonable precautions in protecting the active area of the diode from x-radiation.

A second factor to be considered is optical efficiency in coupling the light produced by the scintillator to the active surface of the diode with minimum attenuation. In that regard, it is desirable to maximize the active area of the diode and to associate that active area as closely as possible with the scintillator to maximize coupling.

Most of the commercially available solid state detector scanners are of the fixed ring type in which the detector is at a reasonable distance from the center of the scan circle. That type of detector usually has a fairly large detector aperture and as a result fairly large scintillators. They can be considered reasonably "wide aspect" optical devices. Realizing that the majority of the photons created by incident x-radiation are created near the front face of the scintillator and must ultimately reach the diode at the rear face in order to be collected, the comparatively large crystals in the wide aspect design require fewer interactions of the photons with the crystal sides in their travel from the point of creation to the diode. In a rotating detector configuration, the detector is closer to the center of the scan circle, and that imposes a requirement for fairly small detector cells, and correspondingly narrower crystals. That configuration produces a "narrow aspect" optical system, which is characterized by many reflections of the photons in their travel to the diode for collection. The rotating detector geometry therefore imposes rather stringent optical coupling requirements on its solid state detector.

Some of the earlier used scintillator materials such as cesium iodide have fairly high light output. However, because of other deficiencies, other scintillator materials are currently preferred. For a number of reasons, it is desirable to use cadmium tungstate as the scintillator material in a high resolution detector. However, the main drawback associated with that material is a relatively low light output. Accordingly, use of cadmium tungstate demands even greater optical efficiency in the detector.

In view of the foregoing, it is an object of the present invention to produce a solid state detector which couples light produced in the scintillator to the diode more efficiently than detectors used heretofore.

Further in that regard, it is an object to produce such a detector which is modular in nature for ease of assembly.

Other objects and advantages will become apparent from the following detailed description when taken in conjunction with the drawings in which.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, the figures show only a portion of a detector array, concentrating on the features necessary to illustrate the present invention. As is well known, in a rotating detector CT scanner (which represents the preferred embodiment of the present invention), the detector is typically arcuate in shape and can include a relatively large number of detector cells often between 500 and 1,000 cells. A typical cell can be on the order of 0.050" wide, a figure which gives some appreciation of the narrow aspect optical system involved.

Figure 1:
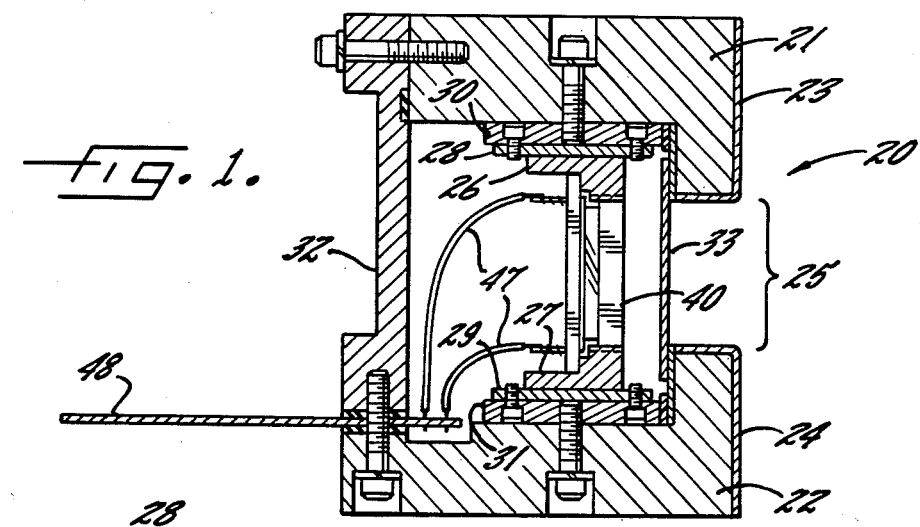
FIG. 1 is a sectional elevtion showing a detector embodying the present invention.

FIG. 1 shows a detector 20, based on a pair of rigid end members 21, 22 which carry a pair of lead shields 23, 24 to define a window 25 which receives a swath of x-radiation. A pair of supports 26, 27 preferably of Macor are bonded to respective mounting channels 28, 29. Those channels in turn are fixed to a further pair of plates 30, 31 which in turn are bolted to the housing elements 21, 22. The rear plate 32 closes the rear of the assembly while a previously positioned front window element 33 (preferably graphite fiber impregnated with epoxy) seals the front window to light while admitting x-rays.

Figure 2:
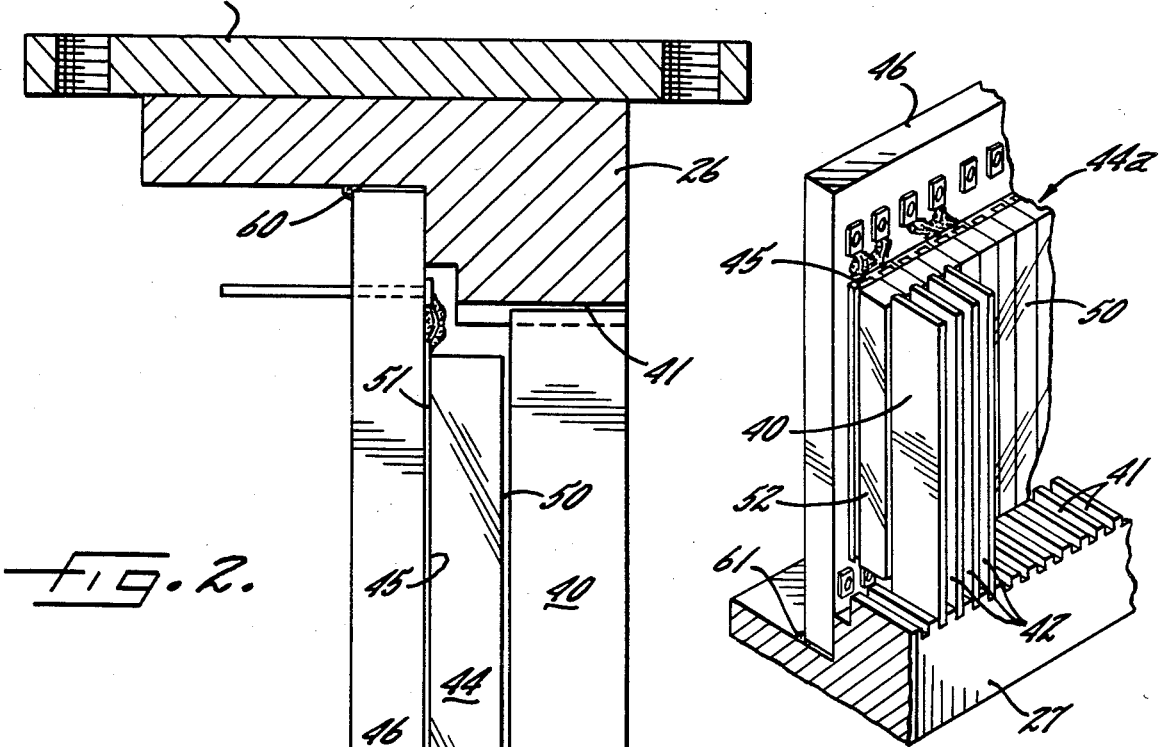
FIG. 2 is an enlarged view showing the detector elements of FIG. 1 and their interrelationship.
Figure 3:
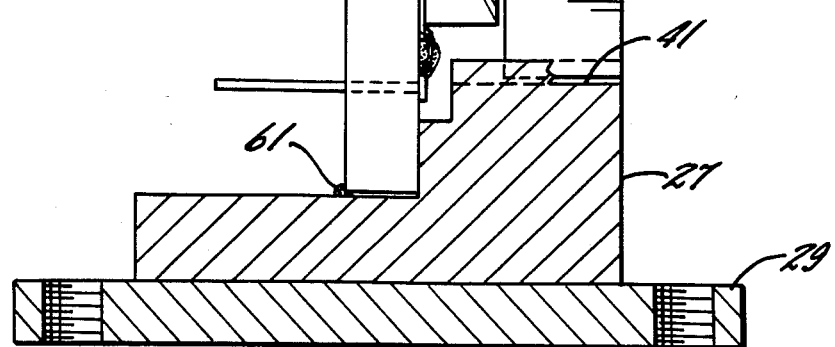
FIG. 3 is a partly broken away perspective view showing a number of detector cells.

FIGS. 2 and 3 better illustrate the cell elements constructed in accordance with the present invention. As best shown in FIG. 3, the Macor elements (only element 27 is shown) are slotted at 41 to accurately position a plurality of collimator plates 40, preferably of tungsten. The narrow spaces 42 between the plates are the detector channels themselves.

Within each cell is a scintillator element 44 which is adapted to convert incident x-ray flux into photons for detection by associated individual diodes 45 in a diode module 46. Wires 47 (see FIG. 1) connect the diode terminals to a printed circuit board 48 which is connected to a data acquisition system. Accordingly, the electrical signals transmitted to the data acquisition system are measures of the amount of flux received within each of the individual cells of the detector.

For purposes of orientation, the face 50 of the scintillator nearest the collimator plate will be called the front, the face 51 nearest the diode will be called the back or rear, and the elongated faces 52 which are generally parallel to the tungsten plate will be called the sides. The scintillator will be treated as a cadmium tungstate crystal which is the preferred embodiment, although it is appreciated that the principles of the invention can be applied to scintillators of other types. Cadmium tungstate is preferred because of its uniformity, x-ray stopping power, and fast speed of response.

Positioning of the diode behind the scintillator as shown in the illustrated embodiment is very desirable when using a cadmium tungstate scintillator because it achieves a greater diode active area than designs where diodes are at the top and bottom of the scintillator. In addition, the uniformity of response in the vertical direction is better than the 2 diode approach. However, positioning the diode behind the scintillator as illustrated imposes constraints on the depth of the scintillator, i.e., the dimension from front to back. More particularly, the scintillator must have sufficient depth to shield the diode from direct x-rays. It has been found that a 3 millimeter depth is sufficient to absorb more than 99.9% of the x-ray flux at 120 Kvp.

Because the optical system is of the narrow aspect variety, it is undesirable to make the scintillator any deeper than necessary. More particularly, a large proportion of the x-rays are captured and transformed to light near the front 50 of the scintillator and must travel through the major depth thereof, suffering multiple reflections because of the thinness of the crystal, before reaching the diode for detection.

In order to enhance light travel through the crystal to the diode, those elements are specially configured to employ light piping techniques. First of all, the cadmium tungstate crystal itself must be properly oriented. Cadmium tungstate has a different index of refraction as a function of direction through the crystal lattice. The lowest index direction is parallel to the cleavage plane. Accordingly, in practicing the present invention, the crystal is oriented such that the sides 52 conform with the cleavage plane. In addition, the side surfaces are highly polished for efficient light piping from the front to the back. If the sides are cleaved, they naturally result in highly polished surfaces, which can be even further polished; the greater the degree of polish, the higher the light output.

As can be appreciated with respect to FIGS. 2 and 3, contrary to many previous designs where the collimator plates were positioned between the scintillators, in practicing this aspect of the present invention, the collimator plates terminate at the front face 50 of the scintillators. Cadmium tungstate is sufficiently self-absorptive to x-rays to allow elimination of the tungsten collimator plates at about a 2% crosstalk penalty.

In that arrangement, in order to minimize optical crosstalk, the sides of the scintillator, having been optimized with respect to light piping, are then coated in such a way as to preserve their light piping effect and at the same time minimize optical crosstalk. Accordingly, metallic films which would tend to destroy the critical angle of reflection and dramatically decrease light output are avoided, and instead a chemical coating is applied. It has been found most effective to use chemical coatings containing $TiO_2$ particles having a particle size corresponding with the wavelength of the light, suspended in a binder medium having an index of refraction greater than 1.5, in acrylic, lacquer, or urethane. Five sides of the crystal are coated with that material, all but the rear, which is intended to be in contact with the diode.

In the case where the crystals are to be bonded into a module in a manner to be described below, the $TiO_2$ coatings are maintained at a minimum thickness to promote close packing of the crystals. To enhance the opacity of the optical barrier between crystals, it is desirable to further coat the crystal with a 0.25 mil. silver flake coating to eliminate crystal optical crosstalk.

It has been found that cadmium tungstate tends to trap a relatively large amount of light because of its high index of refraction. Having highly polished the sides of the crystal to enhance light piping, the remaining sides are left rough in order to de-trap the light by diffuse scattering. Furthermore, because of the tendency to trap light, in practicing the invention, an optical coupler of index greater than 1.5 is interposed between the rear of the crystal and the active surface of the diode. The roughened surface along with the optical coupler serve to maximize the efficiency of light travel across the boundary.

In practicing a further aspect of the invention, the optimized crystal and diode configuration described above is incorporated into a multi-channel module, a number of which can be used to form a complete detector array. Because there is no need to interpose collimator plates between the scintillators, as shown in FIG. 3 the collimator plates can be bonded into their respective slots prior to becoming associated with the active cell elements. A plurality of scintillator bars, optimized for light piping, optical crosstalk and the like as described above are then bonded together side-to-side to form a scintillator module 44a; in one embodiment 16 scintillators make up a module. The diode assembly 46 similarly carries 16 individual diodes 45 with the size and location thereof conformed to the width of the scintillators. After the scintillator bars are bonded together into the module 44a, the rear surface of the module is lapped flat using a grade of abrasive capable of producing the desired rough rear face. The rough surface enhances the transfer of light out of the respective scintillators and the flatness of the module provides uniform and optimized light collection from all parts of the module. An optical coupling medium such as Epotek X304 is then deposited either on the face of the diode or the rear of the scintillator, following which those elements are brought into contact in a jig which not only controls the relative position of the scintillator with respect to the diode but also establishes the thickness of the optical coupling medium therebetween. The resulting scintillator/diode module is then positioned behind the tungsten plates, which had been previously been bonded into their slots, with the tungsten plates located at the junctions of the scintillators. As such, there is little if any chance for x-ray punch-through to the diode. After carefully aligning the scintillator/diode module behind the collimators, by means of a fixture or optical alignment techniques, the module is bonded at 60, 61 to the Macor substrate. Using the 16 channel example, what has then been produced is a 16-channel subassembly which can be mounted as described previously in the detector array.

Among the benefits attributable to the above-described modular configuration, is the ability to use significantly wider scintillators and therefore significantly wider diodes than has been possible in designs which bond those elements to a collimator plate. The wider diode yields a larger active area which in turn translates into higher light collection efficiency.

Mechanically, this modular approach is comparatively less complex than many which have been proposed in the past. The individual parts are less complex and expensive, and assembly is facilitated by appropriate jigs and fixtures.

Finally, the instant modular configuration is more reliable than individual or dual cell approaches because of the inherent redundancy of the bonded surfaces established between the diode module and scintillator module.

It will now be appreciated that what has been provided is an improved solid state detector and module particularly suited to low light output scintillators and capable of maximizing the transfer of the light from the scintillator to the diode for collection.

I claim as my invention:

1. A scintillator/diode module for use in a solid state x-ray detector comprising, in combination, a diode module having a plurality of individual diodes, a similar plurality of scintillators, each scintillator comprising a crystal having an index of refraction which differs as a function of direction through the crystal lattice, the lowest index direction being parallel to the cleavage plane, each scintillator having a front face for receiving x-rays, a rear face for coupling with a diode, and juxtaposed sides, each scintillator being oriented such that the cleavage plane thereof conforms to the sides, and means for causing each scintillator to serve as a light pipe from front to rear including polished sides on each scintillator, coating means on the sides for minimizing crosstalk between scintillators, said plurality of scintillators being joined at the sides for forming a scintillator module, and optical coupling means joining the scintillator module to the diode module with the scintillators in registration with the respective diodes.

2. The module as set out in claim 1 wherein the scintillators are cadmium tungstate.

3. The module as set out in claim 2 wherein the scintillator includes means for causing the scintillator to de-trap light, said last mentioned means including roughened surfaces on all of the scintillator faces except the sides.

4. The module as set out in claim 2 wherein the faces of the scintillator except for the rear face are coated with a coating of $TiO_2$ suspended in a binder.

5. In a solid state x-ray detector having a plurality of channels for converting incident x-ray flux into corresponding electrical signals, the improvement comprising, an array of collimator plates defining the channels, a modular scintillator/diode assembly registered behind a plurality of said plates, and including: a plurality of scintillator bars each comprising a crystal having an index of refraction which differs as a function of direction through the crystal lattice, the lowest index direction being parallel to the cleavage plane, and each having a front face for receiving x-rays, a rear face for transmitting light and two sides, each scintillator being oriented so that the cleavage plane conforms to the sides, means for causing each scintillator to act as a light pipe from front to rear including polished sides on each scintillator, coating means on the scintillator sides for minimizing light penetration through the sides of each scintillator, a plurality of said scintillators being joined at the sides for forming a scintillator module, a diode module positioned behind the scintillator module with individual diodes in registration with individual scintillators, and optical coupling means joining the diode module to the scintillator module.

6. The improvement as set out in claim 5 wherein the scintillator is cadmium tungstate.

7. The improvement as set out in claim 6 wherein the scintillator includes means for causing the scintillator to de-trap light, said last mentioned means including roughened surfaces on all of the scintillator faces except the sides.

8. The improvement as set out in claim 6 wherein the faces of the scintillator except for the rear face are coated with a coating of $TiO_2$ suspended in a binder.

9. The improvement as set out in claim 5 wherein the scintillator module has a rear face for joining to the diode module, said rear face being lapped for enhancing flatness and roughness.

* * * * *